Nov. 5, 1929.  C. N. BERGMANN ET AL  1,734,108
UNIT MEASURING MACHINE
Filed July 1, 1925   8 Sheets-Sheet 7

Nov. 5, 1929.  C. N. BERGMANN ET AL  1,734,108
UNIT MEASURING MACHINE
Filed July 1, 1925    8 Sheets-Sheet 8

Patented Nov. 5, 1929

1,734,108

UNITED STATES PATENT OFFICE

CHRISTIAN N. BERGMANN, OF PITTSBURGH, PENNSYLVANIA; ELMER Z. TAYLOR, OF NEWARK, NEW JERSEY; AND CYRUS TAYLOR, OF HARTFORD, CONNECTICUT, ASSIGNORS TO BERGMANN PACKAGING MACHINE COMPANY, OF PITTSBURGH, PENNSYLVANIA, A CORPORATION OF DELAWARE

UNIT-MEASURING MACHINE

Application filed July 1, 1925. Serial No. 40,796.

Our invention is an improvement in machines for measuring units of mobile material, as ice cream, for separating such measured units from a mass, depositing them separately into containers, capping the containers, and ejecting the filled containers. The invention also embodies an improved mechanism for placing the containers in a carrier whereby they are brought separately into position for filling, capping and ejection.

The present invention is generally similar in its main elements to that shown in a prior application filed by C. N. Bergmann et al. on April 4, 1925, Serial No. 20,696, but differs therefrom mainly in the substitution of an intermittently rotatable carrying turret for the receptacles, in place of the longitudinally movable carrying trays thereof, as well as in other respects hereinafter described.

In the present construction we provide a rotatable turret wheel having an annular series of cup receiving cavities by which each cavity is brought successively in registering position underneath the cup depositor, the filling mechanism and the capper, and then over the ejector. Also an improved cup depositor and cover placing mechanism with a suction controlled plunger, means for actuating the several operative mechanisms in sequence with suitable rest periods, and various features of detail construction, as shall be hereinafter more fully described.

In the drawings illustrating one preferred embodiment of the invention.

Figure 1:
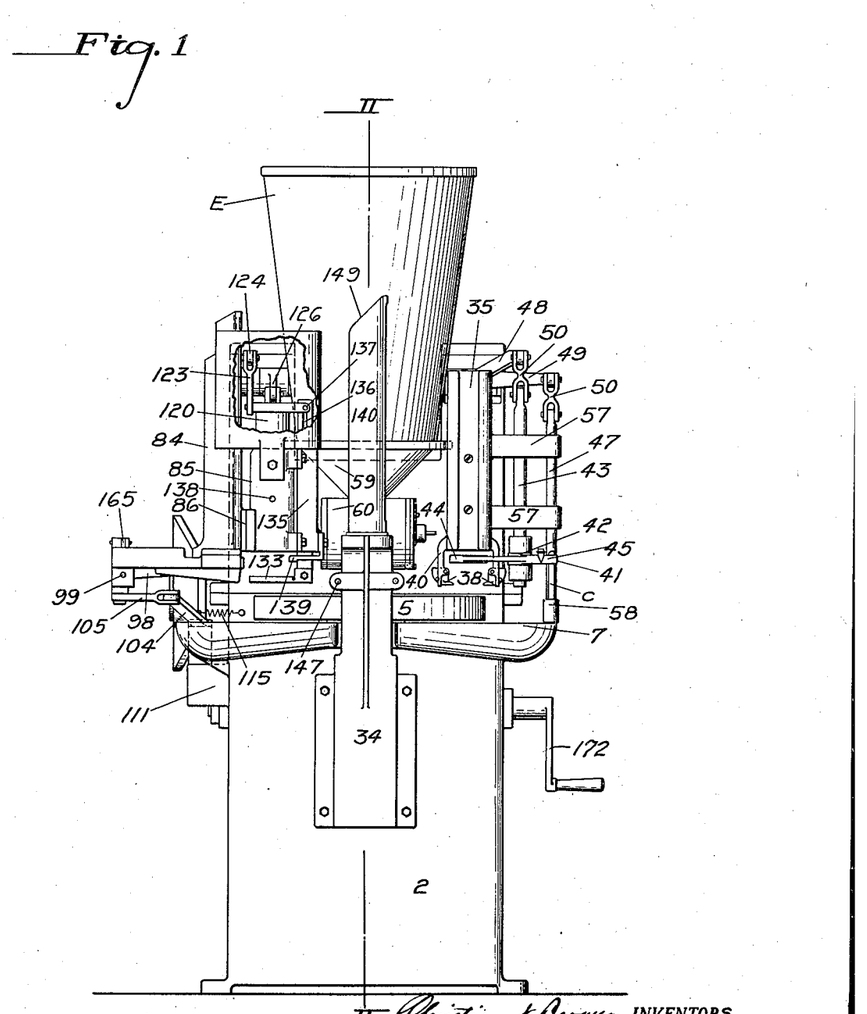
Figure 1 is a view of the machine in front elevation.
Figures 3, 4, 5:
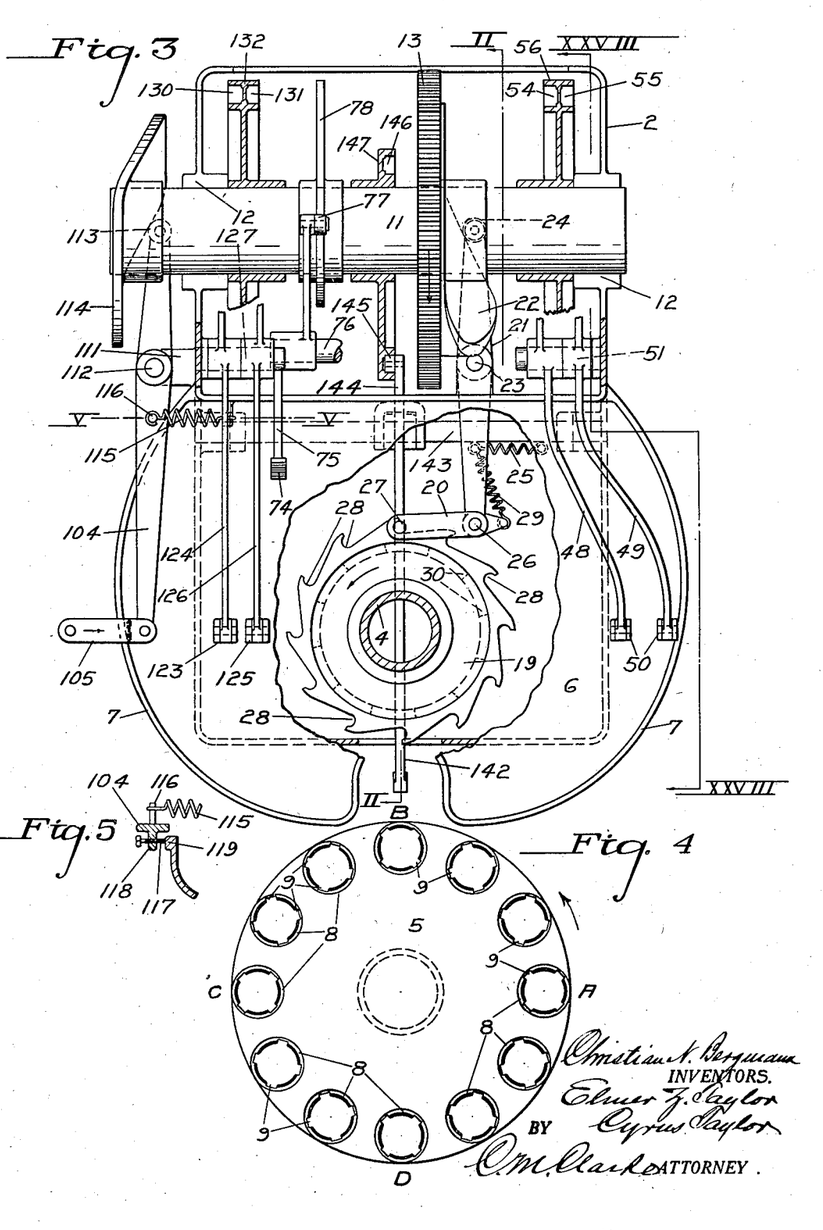
Figure 3 is a horizontal sectional view on the line III—III of Fig. 2, with the turret removed and partly broken away.
Figure 4 is a plan view of the turret.
Figure 5 is a detail sectional view on the line V—V of Fig. 3.

Referring to the drawings, the operative portions of the machine are mounted upon and within a hollow box shaped base 2 of cast metal supported upon the floor or foundation by a suitable flat pedestal, as in Fig. 1. At the front middle portion of the base is a vertically arranged bearing 3 in which is rotatably mounted the central depending stem 4 of the turret 5. Bearing 3 is cast integral with a laterally extending transverse bottom wall 6, forming a concave dish or basin, surrounding the turret beyond the lower base and providing a rearwardly inclined collecting and drainage cavity for excess cream, washing, etc. As shown in Fig. 3 the outer edges 7 are rounded, and surround the turret, a drain connection being made at the lower level for cleaning purposes. Turret 5 is generally of the form of a flat wheel or disk having an annular series of tapered sockets 8 open at the bottom and provided with lateral clearance openings 9 for the discharging plunger 10. Sockets 8 are of a size to receive and support on their flanged bottoms the cups or receptacles a as they are deposited therein for filling.

It will be understood that sockets 8 are in multiples of four, as twelve, so as to always locate a socket at four equidistant points around the center in position for cup depositing, filling, capping and discharge at each intermittent rest period of the turret.

The several mechanisms for such purpose receive their operative movement from a main transverse shaft 11 mounted in bearings 12—12 of the main frame 2. Shaft 11 is driven through gearing 13—14—15—16 or other suitable gearing, from a motor 17. Said motor is mounted on an interior supporting shelf or base 18 of the frame and is provided with the necessary current supply, controls, etc.

Turret 5 is intermittently rotated, say one twelfth of a revolution with an intervening rest period, by a ratchet wheel 19 and pawl 20 of lever arm 21 by cam 22 extending from or movable with gear 13. Lever 21 is pivoted at 23 and its terminal roller 24 is held against the annular face of cam 22 by a spring 25. Pawl 20 is pivoted at 26 to the other end of lever 21 and its free end has a terminal pin or roller 27 adapted to engage the successive teeth sockets 28 of the ratchet wheel 19 for each operation, under control of spring 29 secured to the other end of the pawl and to the lever, as shown.

The under side of ratchet wheel 19 is provided with a series of holding sockets 30 adapted to co-act with roller 31 of a spring retracted stud 32 mounted in a supporting housing 33 of the discharge plunger housing 34. In its intermittent rotation, one complete revolution of the turret will bring each of the annular cavities 8 into rest positions A, B, C and D respectively. In such positions, a cup is placed in the cavity at A, the cup is filled at B, the cover or cap is placed in the cup at C, and the filled cup is discharged upwardly at D.

We will now describe the cup depositor.

The cups a provided with a rim b are nested in a vertical column above position A in a slotted magazine tube 35 rigidly supported from a rear gear housing extension 36 by bracket 37. Each cup is tapered to fit snugly within the cavity 8 without binding. Means are provided for lowering the endmost cup into the cavity and arresting and detaching it while the remaining cups are lifted upwardly and there held until the turret has moved one space, when such operation is repeated.

For the purpose of positively separating and detaching the lowermost cup a, a pair of inwardly gravitating counterweighted fingers 38 are pivoted at 39 at opposite sides in downwardly extending arms 40 of the magazine tube.

Figure 6:
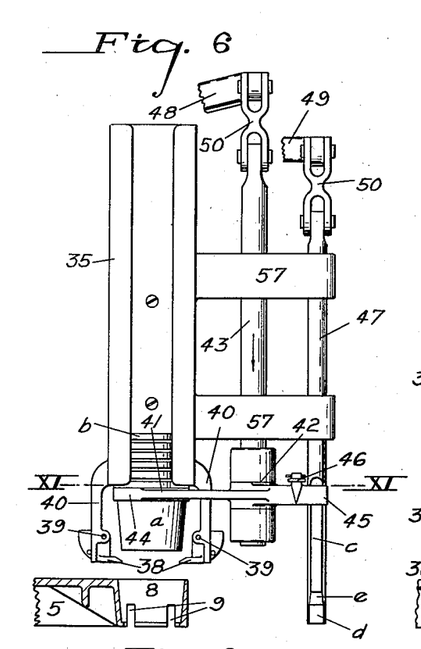
Figure 6 is an enlarged detail view of the cup depositing mechanism, showing the clamp raised.
Figures 7, 8:
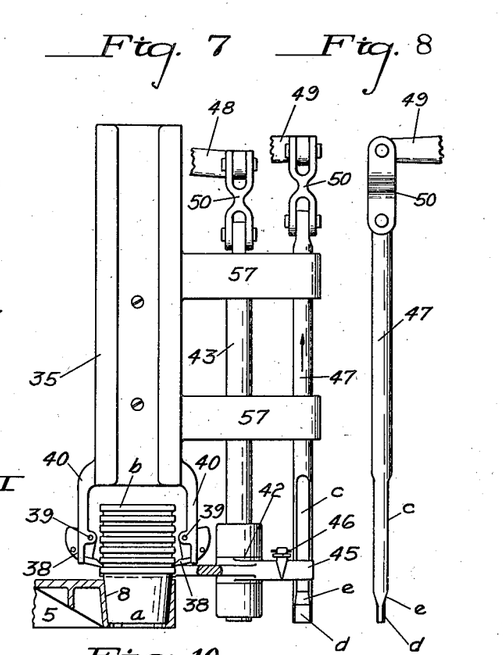
Figure 7 is a similar view showing the clamp lowered to place the lowermost cup in the turret cavity.
Figure 8 is an edge view of the wedging spindle.
Figures 9, 10, 11, 12:
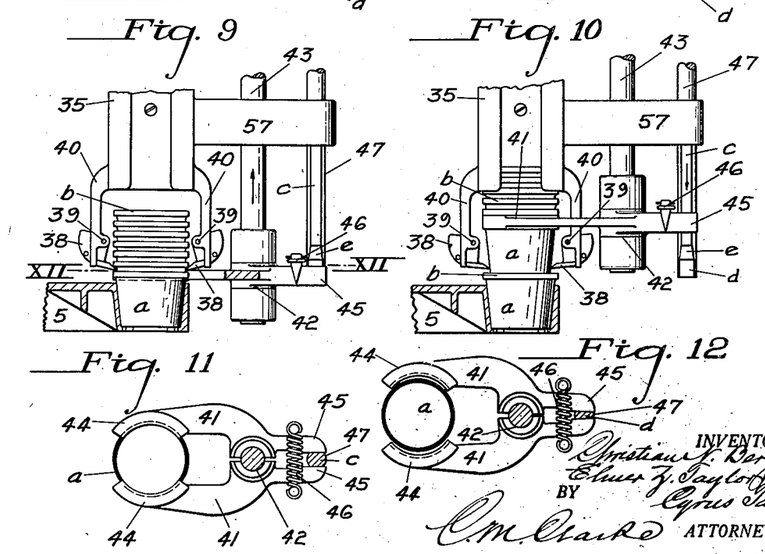
Figure 9 is a view similar to Fig. 7 with the clamp released from the lowermost cup.
Figure 10 is a similar view showing the clamp engaging the next upper cup, and elevating the bank of cups beyond the stripper retained lower cup.
Figure 11 is a horizontal section on the line XI—XI of Fig. 6.
Figure 12 is a similar view on the line XII—XII of Fig. 9.
Figures 28, 29, 30, 31, 32, 33:
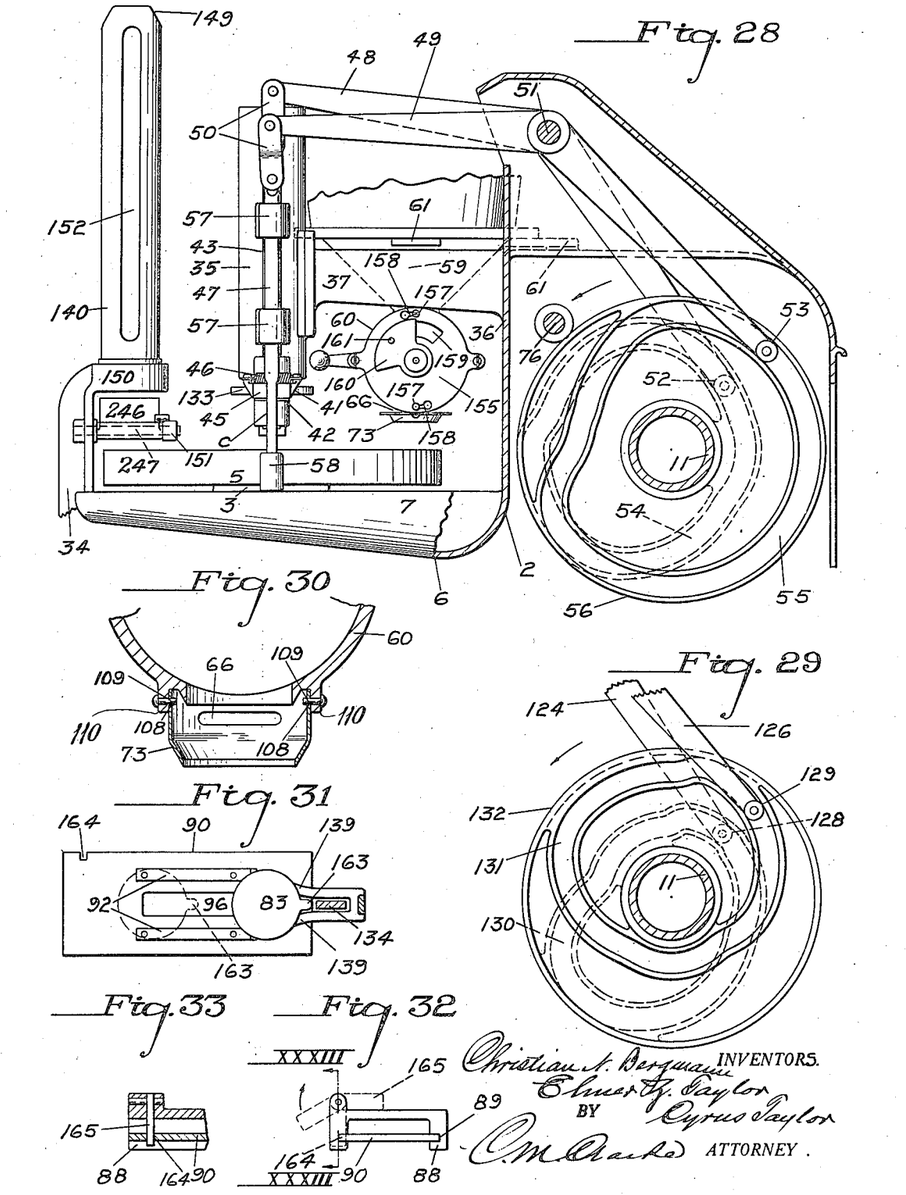
Figure 28 is a sectional elevation on the line XXVIII—XXVIII of Fig. 3.
Figure 29 is a detail face view of the cover placing cam.
Figure 30 is a detail view of the guiding shell for the filler.
Figure 31 is a horizontal sectional view on the line XXXI—XXXI, of Fig. 20, showing the cover pushing plate and arresting bracket
Fig. 32 is an end view, showing the pusher plate lock.
Fig. 33 is a sectional view of the lock on the line XXXIII—XXXIII of Fig. 32.

A pair of gripping tongs 41—41 are pivoted for opening and closing movement at 42 on the lower end of a vertically movable stem 43. The tongs have inner concaved clamping jaws 44 and outer lever extensions 45 which are normally drawn together by a spring 46 for opening the jaws. Between the levers 45 is a vertical wedging bar 47 having a jaw closing section c and a thinner jaw opening section d with an intervening wedge e. It is designed that stem 43 and bar 47 shall be raised and lowered independently and in synchronism in such a manner as to effect closing of the jaws to clamp around the rim of the lowermost cup as in Figs. 6 and 11; then to lower the entire bank of cups to place the lowermost one in cavity 8 of the turret wheel as in Fig. 7; then to release such cup as in Figs. 9 and 12; then to move upwardly the distance from one rim to the next with the jaws open; and then to close the jaws around the rim of the next upper cup and raise it with the entire series upwardly, leaving the lowermost cup released by fingers 38 in the cavity 8, as in Fig. 10. For such purpose bar 43 has a lever 48 and stem 47 has a similar lever 49 connected by links 50—50 and each fulcrumed on a hinge bar or stud 51. The other arm of said levers is each provided with a terminal roller 52—53 respectively riding in cam grooves 54—55 at opposite sides of a cam 56 mounted on shaft 11. The grooves 54—55 are so designed (Fig. 28) as to effect independent raising and lowering of the levers and the clamping jaws and their controlling wedge bar in proper sequence to effect the operations above described. The stem and bar are each mounted in suitable guides 57 extending from the tube 35, and a protecting guard socket 58 for the lower end $d$ of bar 47 extends upwardly from the rim 7.

*Cup filler*

When the cup is moved around to position B it is filled with ice cream, or other commodity, by means similar to that shown in the prior application noted. Depending below a hopper bottom 59 of hopper E is a short cylindrical casing 60, supported from the upper frame of the machine by flanges 61 bolted thereto.

Figure 13:
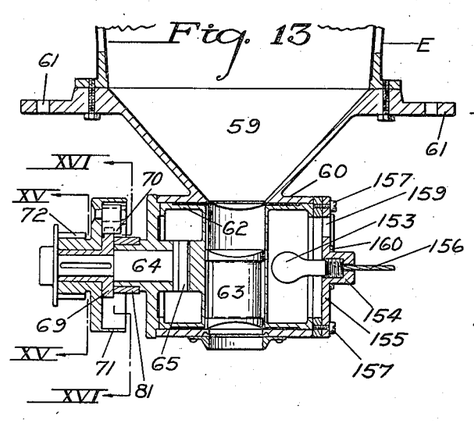
Figure 13 is a detail vertical section on the line XIII—XIII of Fig. 2, showing the cream filler.

Within casing 60 is a rotatable drum or barrel 62 having a middle transverse passageway adapted to register with the bottom opening of the hopper and an opposite discharge opening in the casing, as in Fig. 13. A reciprocable plunger 63 acts to withdraw and eject a measured unit of ice cream into the cup at each half revolution of the barrel 62 described in said application. The casing 60 is closed at one end providing a central bearing for a rotating spindle 64 removably connected in driving engagement with the inner end of the drum at 65, allowing for its withdrawal from the other end.

Keyed to the outer end of spindle 64 is a ratchet wheel 69 having two oppositely located teeth for engagement by the spring pressed pawl 70 of a shrouded wheel 71. Said wheel is freely journalled around the hub of the ratchet 69 and has a pinion gear 72 formed thereon.

Pinion 72 is actuated for one half revolution by a segment gear 74 at the outer end of lever 75 pivoted on stud 76 and having a roller terminal 77 at its inner end bearing against the face of cam 78 on main shaft 11. A spring 79 secured to the lever and to an abutment 80 of the frame holds the lever firmly but resiliently against the face of cam 78. Each revolution of the cam produces at the proper time a half rotation of the barrel 62 with discharge of a measured unit, so long as pawl 70 is in operative position.

Figures 15, 16, 17, 18:
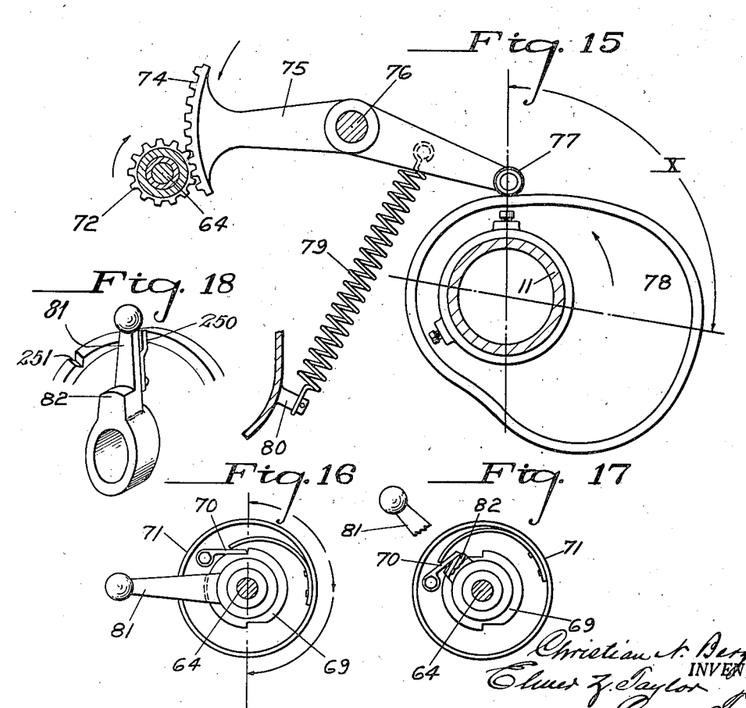
Figure 15 is a transverse section on the line XV—XV of Fig. 13 showing the ratchet rotating mechanism for the cream filler drum.
Figure 16 is a sectional detail view on the line XVI—XVI of Fig. 13 showing the cam actuated mechanism for rotating the drum of the cream filler, in normal operative position.
Figure 17 is a similar view, showing the pawl retracted by the throw out lever.
Figure 18 is a detail view showing the inner side of the throw out lever for the pawl of the drum ratchet.

Cam 78 is so proportioned that it will rotate the drum the desired one half revolution, such active portion of the cam being indicated by the line X Fig. 15. The remaining portion of the cam rotation is during reversal of pinion 72 and stationary condition thereof, providing an ample rest period for functioning of the filler.

For the purpose of preventing dripping or slopping of the cream, and for positively centering the drop of the formed unit into the cup $a$, a downwardly extending tubular shell 73 is secured to the under side of the casing 60 concentric with the plunger cavity. The general views show a shallow form of such shell, and a longer form is shown in detail in Fig. 30. Said shell is preferably larger at the top than the diameter of the plunger cavity and tapers towards the bottom where it is approximately the same size as the unit. The shell 73 is held in any suitable manner, as by bayonet joint slots 108 engaging pins or studs 109 on the inner sides of a flange 110 of casing 60.

The shell may thus be easily removed for cleaning of any of the parts, and easily and quickly replaced. One or more air circulation openings 66 are provided, or the upper edge may be left partly open, so as to facilitate free falling of the unit therethrough without retardation arising from a partial vacuum condition.

When it is desired to put the filling mechanism out of commission at any time, a throw out lever 81 is thrown to the position of Fig. 17. Said lever is journalled by its hub around the tubular bearing of the casing, and has a lug 82 which rides under the extended edge of pawl 70, so as to hold it outwardly from engagement with the ratchet tooth. In such position a half rotation of the shrouded wheel will impart no movement to the drum until the throw out lever is thrown back to the position of Fig. 16, allowing the pawl to function.

By such means, the filler may be put out of service and the machine operated as to its other functions by merely throwing the lever 81 to disengaging position, Fig. 17, where it may be held by a suitable catch 250 engaging one of two V shaped sockets 251 in the inner face of the cylinder head.

Under certain conditions it is desirable to heat the unit forming mechanism, and to regulate the heat from time to time, dependent on the temperature of the ice cream being used in the machine.

For such purpose we utilize any suitable heating device, as a resistance element or lamp 153 located in the hollow end of rotatable barrel 62. The lamp is mounted by its socket in the central hub 154 of a closing end plate 155 and receives current by wires 156 extending through the center thereof.

Plate 155 is secured by screws 157 extending through annular slots 158 having terminal holes, permitting application or removal of the plate by a short turning movement.

Figure 14:
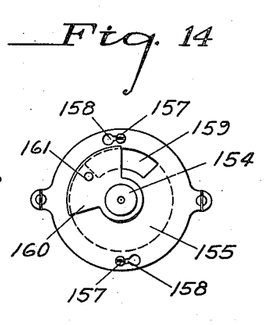
Figure 14 is an end view of the cream filler, showing the adjustable air control damper.

For the purpose of providing ventilation, plate 155 is provided with a segmental opening 159. A regulating damper plate 160 is journalled around the hub 154 provided with a button 161 by which it may be accurately set to the desired degree, as in Figs. 13 and 14.

Capper

The filled cups are capped at position C by placing within the upper edge of each cup a thin paper disk 83 having a projecting withdrawal tang. Said disks are mounted in a vertically arranged bank in a magazine tube 84, slotted along its outer side, and fixedly bolted to the plunger frame 85 at 86. The plunger frame 85 is rigidly supported in front of the gear housing framing 36 of the machine by a bracket 87. Secured underneath the bottom of magazine tube 84 is a horizontal track plate 88 having a flanged trackway 89 in which is slidably mounted the cover slide or shifting plate 90.

Said slide is in the form of a flat plate adapted to move immediately underneath the bank of caps 83 and to support the lowermost of the series of caps upon its front shelf extension 91. At each side of its longitudinal center are strips 92—92 which extend above the level of the surface of the plate sufficiently far to support the disks above the plate with sufficient clearance of the push finger or trigger on backward movement.

Figures 19, 20, 24:
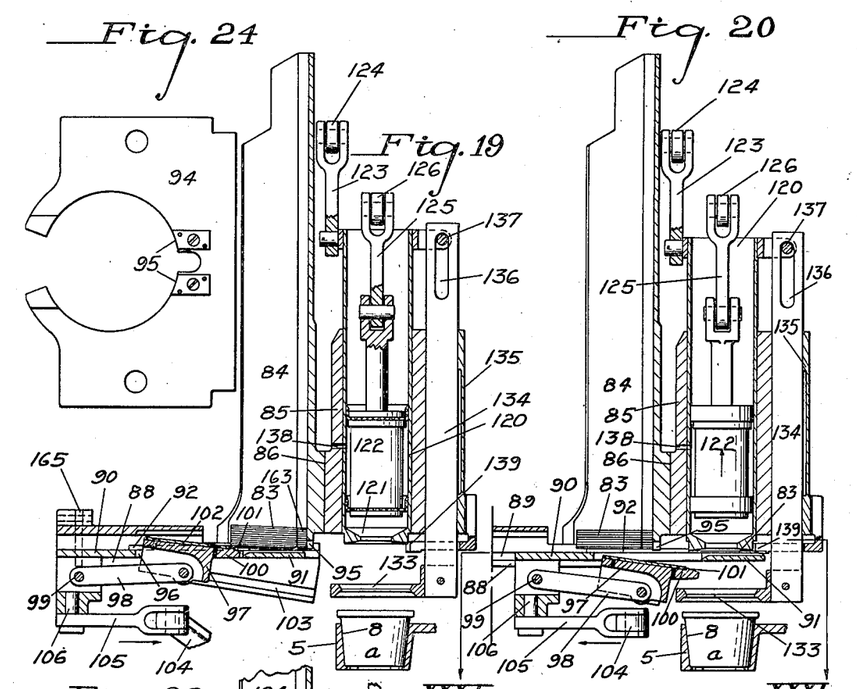
Figure 19 is an enlarged vertical section on the line XIX—XIX of Fig. 2 showing the capping mechanism in its initial position.
Figure 20 is a similar view, showing the cap placed underneath the suction plunger.
Figure 24 is an under plan view of the bottom of the cap magazine.

The bottom of the cap magazine is flat as at 94, Fig. 24, having a middle clearance opening and a tang opening for clearance of the caps, and limiting blocks or abutments 95. These extend downwardly close to the surface of shelf 91 of plate 90, with just sufficient clearance for passage of the lowermost cap as it is pushed inwardly. Plate 90 has a central longitudinal slotted opening 96 for clearance of the preliminary push finger 97 which moves in and out with the shifter plate 90. Block 97 is pivotally connected by link 98 with the rear thickened end of plate 90 at 99, and is designed to ride downwardly at a slight incline from its initial outer position, so as to become detached from engagement with the lowermost cap after it has been started and is engaged by the ends 93 of strips 92. The advancing end of block 97 is provided with a horn 100 the upper face 101 of which is tapered as shown, so as to provide clearance in case any cap being acted upon at the bottom of the bank should be warped downwardly. By this means the caps are also slightly tilted up at the rear.

The block 97 has a thin steel plate 102 on its top which extends above the highest rear portion of incline 101 and is just thick enough to preliminarily engage the bottom cap by the concaved end of plate 102. Block 97 is mounted by side flanges in a downwardly inclined track 103 depending at each side of track plate 88, so that as the block moves inwardly it will quickly separate the lower cap by the front edge of plate 102 acting as a trigger, and will carry it inwardly.

As the push finger and trigger advances and lowers, it carries the lowermost cap inwardly underneath the limiting abutments 95, and at the same time just in front of the concaved terminals of strips 92.

As the push finger advances and at the same time lowers down inclined trackway 103, the terminal of plate 102 disengages from the edge of the cap, and the cap is then in abutting engagement with the concaved ends of strips 92. These strips, by their concaved ends, act to accurately centralize the cap so as to positively locate it in proper central position under the plunger. At the end of the movement of plate 90 the cap engages against the sides of stop 139 with the tang between them, as in Fig. 31.

Plate 90 is provided at its forward end with a groove 162 for clearance of the cover tang 163 to prevent upward springing of the cap, should the tang be bent down. A notch or socket 164 at one side of the plate provides for locking the plate in retracted position by an adjustable dog 165, should it be desired to put the capper out of service temporarily. See Figs. 32 and 33.

Owing to the restricted clearance space, the cap is forced to lie flat against the surface of the shelf extension 91 and will be carried inwardly to the end of its movement under the suction plunger.

On backward movement of block 97, due to riding upwardly along inclined tracks 103, plate 102 will bear against the rear edge of the next lowermost cap and will tilt it and the corresponding edges of the bank of caps upwardly, as in Fig. 19. Plate 90 and block 97 are moved inwardly and outwardly by lever 104 connected by link 105 underneath to the rear end of plate 90 by pivoting stud 106.

Lever 104 is pivoted on supporting bracket 111 of the frame at 112 and extends backwardly, bearing by terminal roller 113 against the inner face of cam 114 on the end of shaft 11. A spring 115 connected to the frame and to lever 104 at 116 holds the roller 113 against the cam and constantly tends to throw the other end of the lever and link 105 and the sliding plate 90 inwardly. The cam 114 is so proportioned that when its outer portion comes opposite the roller, the plate will be thrust inwardly, pushing the lowermost cap underneath the plunger as in Fig. 20, after which the plate is receded to its initial position by the cam.

The outer flat portion of the cam 114 allows the shifting plate 90 to remain inwardly sufficiently long to support the cap upon its terminal shelf 91 until it becomes firmly grasped against the lower end of the suction actuated plunger. Lever 104 is provided with an adjusting temper screw 117 mounted in lug 118 and adapted to engage a bearing lug 119 of the rounded edge of the side frame. By such means the inward movement of the lever and cover plate 90 may be accurately regulated.

Figure 2:
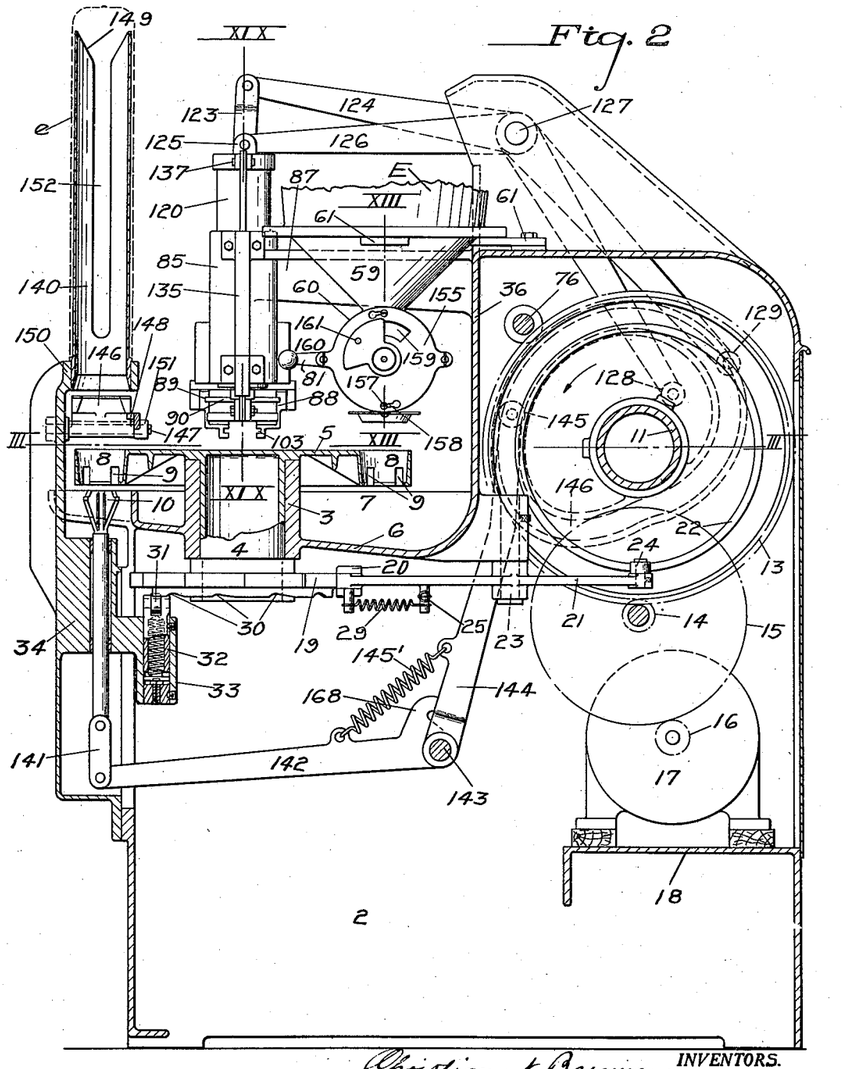
Figure 2 is a partial central vertical section on the line II—II of Fig. 1.

The suction plunger consists of an outer tubular casing 120 having a centrally open slightly concaved head 121, with an inner relatively movable suction plunger 122. Casing 120 is slidably mounted in plunger frame 85 and is vertically reciprocated by a link 123 connected to lever 124. In the same way plunger 122 is connected by link 125 with lever 126, both of said levers being pivotally mounted on a fulcrum bearing 127 across the top of the gear housing frame, as in Fig. 2.

Each lever extends rearwardly and is provided with a terminal roller 128—129, engaging the cam grooves 130—131, respectively of cam 132 on shaft 11.

A centering retaining ring 133 is secured in registering alinement with the plunger and cup cavity through which the cap is lowered into the rim of each cup. Said ring is adapted to be lowered by gravity upon and around the cup rim, as in Fig. 21, as the plunger lowers, and to retain the cup in place with its inserted cap, upon upward movement of the plunger. The ring as shown is tapered inwardly at the top and bottom, providing for centralizing and accurate placement of the cap and for holding engagement against the rim of the cup.

Ring 133 is secured to the lower end of a bar 134 which is slidably guided in a lateral housing 135 of plunger casing 85, and is connected by slot 136 and pin 137 with the upper end of plunger casing 120.

Figures 21, 22:
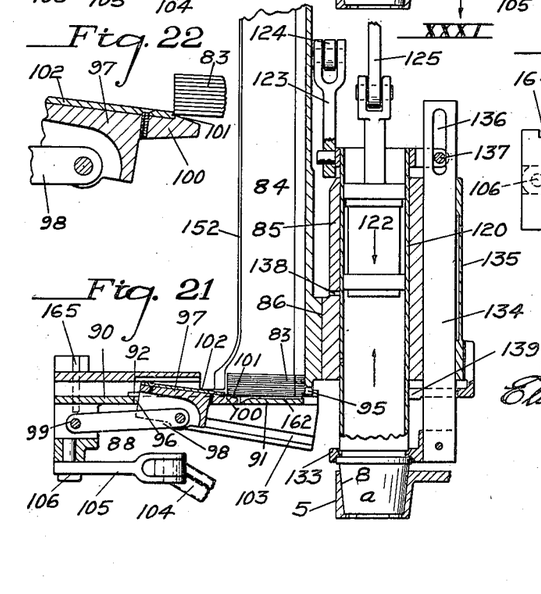
Figure 21 is a similar view showing the cap shifter retracted and the plunger in lowered position.
Figure 22 is an enlarged sectional detail view of the cap selector.
Figure 23:
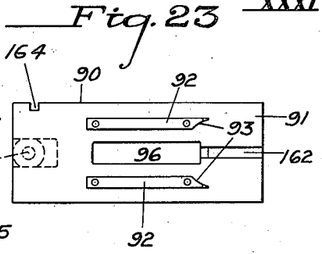
Figure 23 is a plan view of the cap supporting and shifting plate.
Figure 25:
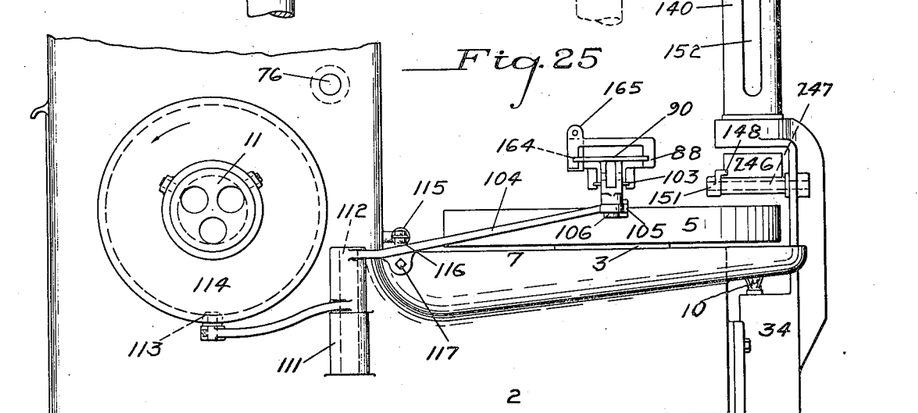
Figure 25 is a partial side view of the machine, showing the cam actuated cap shifting mechanism.
Figure 26:
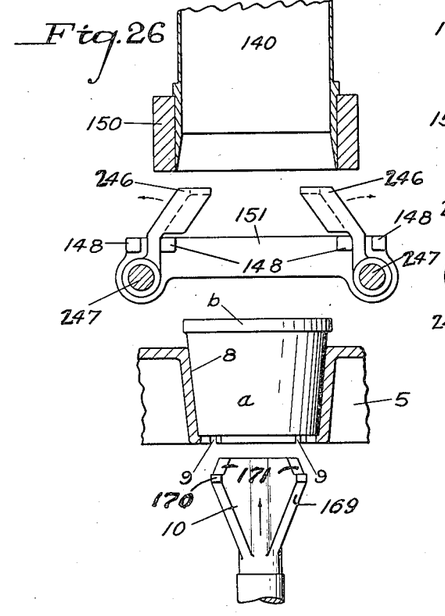
Figure 26 is a sectional detail view showing the cup ejecting and supporting mechanism with the cup in the turret socket.

At the proper level, casing 120 is provided with a relief port 138 to break the vacuum in the plunger casing when plunger 122 rises above said port, as in Fig. 21.

In operation, when the cap is pushed inwardly to registering position with the plunger, head 121 is first lowered upon it, pressing it against the plate shelf. Plunger 122 then commences to travel upwardly to create a suction sufficient to hold the cap 83 against the under side of head 121, and said head is then raised just sufficient, say one quarter inch, to lift the cap clear of the plate, plunger 122 continuing to rise, at a slower speed. The plate is then withdrawn, leaving the cap suspended up against head 121.

Head 121 is then lowered with the cap while plunger 122 rises to increase the suction, and head 121 by its reduced terminal presses the cap through the ring 133 and inserts the cap firmly in position within the rim $b$ of the cup. Plunger 122 continues to rise until it is above port 138, at which time head 121 has placed the cap in the cup. The vacuum is then broken, releasing the suction on the cap and to prevent the cap and cup from being raised out of the sockets 8 of turret 5. The plunger casing and its head, and the plunger then resume their original position, ready for another operation.

The weight of ring 133 and its supporting bar 134 continue to rest on the cup rim until the plunger mechanism has been withdrawn upwardly, preventing any possibility of sticking, and acting to ensure stripping of the cup in each case.

*Cup discharger*

When the filled and capped cup arrives at position D it is ejected upwardly into a receiving cylinder 140 by plunger 10. Said plunger has a series of laterally diverging wings adapted to pass through openings 9 of socket 8 to engage the bottom of the filled cup by its annular edge, avoiding any danger of injuring the middle bottom portion. The stem of the plunger is guided in bearing 34 and is connected by link 141 with the end of lever 142 pivoted to a cross shaft 143. A cam lever 144 is also pivoted on shaft 143 and extends upwardly by a terminal having a roller 145 engaging the cam groove 146 of cam 147 on shaft 11. As the cam rotates, the groove is so designed as to throw the plunger 10 upwardly at the proper time to discharge the filled and capped cup upwardly towards the tube 140.

Ordinarily, levers 142 and 144 will operate together as one piece, but are made separate to allow for easement of the lifting pressure on the cup in case of jamming. For such purpose lever 142 bears up against lever 144 by an extended lug 168 due to the holding action of spring 145' connecting the levers across the angle joint, as in Fig. 2. Normally the cam will impart lifting and lowering movement to the plunger, but if the plunger is arrested for any reason, the hinge joint will open, allowing the cam movement of section 144 to continue without actuating the plunger, until the obstruction is removed.

The shape of the plunger 10 avoids jamming or interference. The lateral wings 169 are provided with terminal abutments 170 and inwardly sloping upper shouldered faces 171 which tend to centralize the cup and plunger, and to support the cup for lifting by its lower edge against the shouldered abutments 170.

Figure 27:
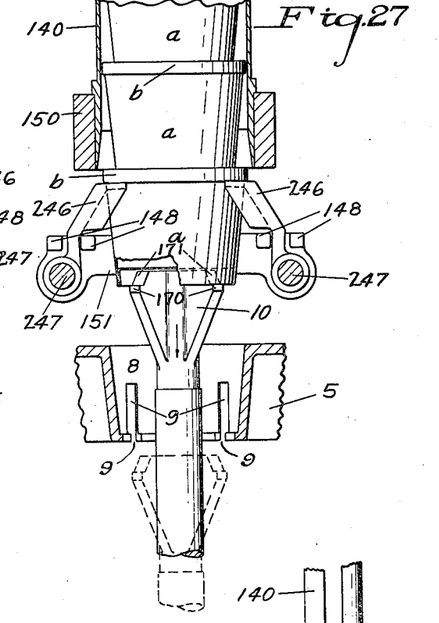
Figure 27 is a similar view showing the cup elevated by the plunger.

Between the bottom of tube 140 and the surface of the turret 5 are interposed a pair of automatic inwardly gravitating cup arresting jaws 246—246. These as shown are pivoted at 247 and fall inwardly by gravity against stop abutments 148, and have inner inclined faces terminating in narrow concaved lips. As the cup is lifted by the plunger, it passes above such lips which engage the rim $b$ as in Fig. 27. At the same time that each succeeding cup is raised, it pushes the already lifted and supported cups upwardly a distance equalling the depth of one cup, the entire series being supported by the jaws 246.

Tube 140 is slotted along opposite sides for inserting the fingers in removing any selected number of cups, and is preferably inclined at the top as at 149. The base of the tube is flared for easy entrance, and is secured in an upper extension 150 of housing 34 as in Fig. 2. Hinge pins 247 are also secured in said support together with the cross bars 151 having the confining abutments 148.

In assembling the filled cups for refrigeration, storage, etc. a paper bag e is placed over the tube 140 in inverted position, the tapered top facilitating such placement, and as many cups as are desired, say four or eight, are gathered upwardly into the bag by lifting the cups, through the opposite open and closed slots 152. Thus the cups and the enclosing bag are removed together as they accumulate by finally lifting through the open slot, the bags being closed at the lower open end in any suitable way.

It will be understood that each of the sockets 8 of the turret is occupied successively by a cup at position A, and that as each arrives at the subsequent positions B, C, and D, the operations above described are performed. Therefore as each socket arrives at the final discharging position, a filled cup is ejected, the empty socket then passing around to position A where a fresh empty cup is deposited.

The operation is continuous, rapid, and substantially automatic, merely requiring renewal of the cup and cap supply in their respective magazine tubes, removal of the filled cups into their paper bags, and of course maintaining a sufficient amount of ice cream at all times in the hopper.

The several movements are all effected through the various cams and their transmitting levers in the manner described and illustrated.

The timing of the operations is easily controlled by the design and setting of the cams and the various adjusting, limiting and controlling devices and mechanisms. The machine as a whole is very compact and of comparatively small size, considering its capacity and speed of operation.

It may be changed or varied by the skilled mechanic in various details or features, or otherwise modified within the scope of the general principle of operation, but all such changes are to be understood as within the scope of the following claims.

We claim:

1. In a unit measuring and packaging machine, the combination with a supporting frame, of a horizontally arranged centrally pivoted rotatable turret having an annular series of uniformly spaced open bottom receptacle pockets arranged around the pivoting center and extending vertically through the turret, a superimposed cup depositor occupying a primary fixed station position, a superimposed unit forming device occupying a second fixed station position, a superimposed cover placing device occupying a third fixed station position, and a lower ejector arranged for upward removal of filled receptacles through the open bottom pockets occupying a fourth fixed station position with reference to the annular pockets of the turret, cam controlled means for periodically actuating the cup depositor, the unit forming device, the cover placing device, and the ejector when the turret is stationary, and cam controlled means for intermittently rotating the turret when said parts are inoperative.

2. In a unit measuring and packaging machine, the combination with a supporting frame, of a horizontally arranged centrally pivoted rotatable turret having an annular series of uniformly spaced open bottom receptacle pockets arranged around the pivoting center and extending vertically through the turret, a superimposed cup depositor occupying a primary fixed station position, a superimposed unit forming device occupying a second fixed station position, a superimposed cover placing device occupying a third fixed station position, and a lower ejector arranged for upward removal of filled receptacles through the open bottom pockets occupying a fourth fixed station position with reference to the annular pockets of the turret, cam controlled means for periodically actuating the cup depositor, the unit forming device, the cover placing device, and the ejector when the turret is stationary, and cam controlled means in operative driving connection therewith for intermittently rotating the turret in synchronism with and when said parts are inoperative whereby when deposited in one of the turret pockets, a cup pocket is brought successively into register with the cup depositor, the unit forming device, the cover placing device, and the ejector at said fixed station positions.

3. In a unit measuring and packaging machine the combination with a supporting frame, of a rotatable turret having open bottom receptacle pockets, a superimposed cup depositor, a superimposed unit forming device, a superimposed cover placing device, and a lower upwardly removing cup ejector, said cup depositor, unit forming device, cover placing device, and ejector occupying fixed station positions with reference to the movable pockets of the rotatable turret, cam controlled means for intermittently rotating the turret with intervening rest periods whereby when deposited in one of the turret pockets a cup is brought successively into register with the relatively stationary unit forming device, the relatively stationary cover placing device, and the relatively stationary ejector, and cam controlled means for actuating said parts during the rest period of the turret.

4. In a unit measuring and packaging machine the combination with a supporting frame, of a rotatable turret having open bottom receptacle pockets, a superimposed cup depositor, a superimposed unit forming device, a superimposed cover placing device, and a lower upwardly removing cup ejector, said cup depositor, unit forming device, cover placing device, and ejector occupying fixed station positions with reference to the movable pockets of the rotatable turret, and means for intermittently rotating the turret with intervening rest periods whereby when deposited in one of the turret pockets a cup is brought successively into register with the relatively stationary unit forming device, the relatively stationary cover placing device, and the relatively stationary ejector, and cam controlled means in operative driving connection with a single drive shaft for actuating said parts during the rest period of the turret.

5. In a filling machine, the combination of a main frame, a horizontal turret wheel provided with an annular series of cup receiving pockets and a central bearing stem, a main shaft, cup depositing mechanism above the turret occupying a fixed station position with reference to the movable pockets of the turret adapted to deliver a cup to each pocket thereof, cam controlled means actuated by the main shaft for rotating the turret with an intervening rest period, and cam controlled means actuated by the main shaft for operating the relatively stationary cup depositing mechanism to deliver a cup during said rest period.

6. In a filling machine, the combination of a main frame, a horizontal turret wheel provided with an annular series of cup receiving pockets and a central bearing stem, a main shaft, material depositing mechanism above the turret adapted to deliver to a cup therein for filling, said depositing mechanism occupying a fixed station position with reference to the movable pockets of the turret, cam controlled means actuated by the main shaft for rotating the turret with an intervening rest period, and cam controlled means actuated by the main shaft for operating the relatively stationary material depositing mechanism to place material in a cup during said rest period.

7. In a filling machine, the combination of a main frame, a horizontal turret wheel provided with an annular series of cup receiving pockets and a central bearing stem, a main shaft, cover placing mechanism above the turret adapted to place a closing cap on the cup, said cover placing mechanism occupying a fixed station position with reference to the movable pockets of the turret, cam controlled means actuated by the main shaft for rotating the turret with an intervening rest period, and cam controlled means actuated by the main shaft for operating the relatively stationary cover placing mechanism to close a filled cup during said rest period.

8. In a filling machine, the combination of a main frame, a horizontal turret wheel provided with an annular series of cup receiving pockets and a central bearing stem, a main shaft, material depositing mechanism above the turret adapted to deliver to a cup therein for filling, cover placing mechanism above the turret adapted to place a closing cap on the cup, said depositing mechanism and cover placing mechanism occupying a fixed station position with reference to the movable pockets of the turret, cam controlled means actuated by the main shaft for rotating the turret with an intervening rest period, and cam controlled means actuated by the main shaft for operating the relatively stationary material depositing mechanism and the relatively stationary cover placing mechanism during said rest period.

9. In a filling machine, the combination of a main frame, a horizontal turret wheel provided with an annular series of open bottom cup receiving pockets and a central bearing stem, a main shaft, cup depositing mechanism above the turret adapted to deliver a cup to each pocket thereof, material depositing mechanism above the turret adapted to deliver to a cup therein for filling, cover placing mechanism above the turret adapted to place a closing cap on the cup, a discharging plunger for filled cups below the turret adapted to push a cup upwardly from a pocket through its open bottom, said cup depositing mechanism, material depositing mechanism, cover placing mechanism, and discharging plunger occupying fixed station positions with reference to the movable pockets of the turret, cam controlled means actuated by the main shaft for rotating the turret with an intervening rest period, and cam controlled means actuated by the main shaft for operating the relatively stationary cup depositing mechanism, the relatively stationary material depositing mechanism, the relatively stationary cover placing mechanism, and the relatively stationary discharging plunger respectively, during said rest period.

In testimony whereof we hereunto affix our signatures.

CHRISTIAN N. BERGMANN.
ELMER Z. TAYLOR.
CYRUS TAYLOR.